US012438838B2

(12) United States Patent
Yogerst et al.

(10) Patent No.: US 12,438,838 B2
(45) Date of Patent: *Oct. 7, 2025

(54) SYSTEMS AND METHODS FOR REDUCING NETWORK TRAFFIC

(71) Applicant: Capital One Services, LLC, McLean, VA (US)

(72) Inventors: Shannon Yogerst, New York, NY (US); Purva Shanker, Arlington, VA (US); Tania Cruz Morales, Washington, DC (US); Haytham Yaghi, Oakton, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/736,471

(22) Filed: Jun. 6, 2024

(65) Prior Publication Data

US 2024/0396857 A1 Nov. 28, 2024

Related U.S. Application Data

(63) Continuation of application No. 18/169,833, filed on Feb. 15, 2023, now Pat. No. 12,088,546.

(51) Int. Cl.
*H04L 51/21* (2022.01)
*H04L 51/02* (2022.01)

(52) U.S. Cl.
CPC .............. *H04L 51/21* (2022.05); *H04L 51/02* (2013.01)

(58) Field of Classification Search
CPC .................................. H04L 51/21; H04L 51/02
See application file for complete search history.

(56) References Cited

U.S. PATENT DOCUMENTS

| 2019/0086988 | A1* | 3/2019 | He | G06F 1/3212 |
|---|---|---|---|---|
| 2020/0387817 | A1* | 12/2020 | Kurtz | G06F 18/251 |
| 2023/0135179 | A1* | 5/2023 | Mielke | G06N 5/022 |
| | | | | 704/232 |
| 2023/0368812 | A1* | 11/2023 | Marchi | G06T 7/70 |
| 2023/0401795 | A1* | 12/2023 | Streja | G06T 13/40 |

* cited by examiner

*Primary Examiner* — Christopher B Robinson
*Assistant Examiner* — Tania M Pena-Santana
(74) *Attorney, Agent, or Firm* — Foley & Lardner LLP

(57) ABSTRACT

Methods and systems for reducing network traffic between a service and client devices. In some aspects, the system receives a first data stream for a first type of communication between a service and a client device for a user. In response to determining that the first data stream includes an unresolved user query, the system determines that a second type of communication occurred between the service and the user. The system processes a second data stream for the second type of communication to determine that the second type of communication includes the unresolved user query and a service response to the unresolved user query. The system provides the unresolved user query and the service response to update a machine learning model used by the service to generate service responses to one or more user queries during a future communication of the first type.

20 Claims, 5 Drawing Sheets

200

202

206　　208

203　　204　　205

SYSTEMS AND METHODS FOR REDUCING NETWORK TRAFFIC

CROSS-REFERENCE TO RELATED APPLICATIONS

This application is a continuation of U.S. patent application Ser. No. 18/169,833, filed Feb. 15, 2023. The content of the foregoing application is incorporated herein in its entirety by reference.

SUMMARY

In recent years, the use of artificial intelligence, including, but not limited to, machine learning, deep learning, etc. (referred to collectively herein as artificial intelligence models, machine learning models, or simply models) has exponentially increased. Broadly described, artificial intelligence refers to a wide-ranging branch of computer science concerned with building smart machines capable of performing tasks that typically require human intelligence. Key benefits of artificial intelligence are its ability to process data, find underlying patterns, and/or perform real-time determinations. Chatbots, a software application used to simulate human-like conversations with users via chat, are built using artificial intelligence. Chatbots utilize natural language processing (NLP) by applying the artificial intelligence models to analyze and determine one or more requests made by the user to the chatbot. By processing such data and automatically performing real-time tasks, chatbots allow human agents to focus on other tasks, while chatbots focus on dealing with user inquiries. However, conventional chatbot systems may not always understand a user's request. In such instances, the user may abandon the text-based communication with the chatbot and instead choose to initiate a voice-based communication with a human agent for assistance. These circumstances can lead to unintended consequences such as a high amount of network traffic generated due to the chatbot's failure to understand user requests. Therefore, conventional systems fail to account for and anticipate increased network traffic between a service and users due to limited capabilities of conventional chatbot systems.

In some embodiments, to address one or more of the technical problems described above, methods and systems are described herein for reducing network traffic between a service and client devices. The system may determine that a data stream for a text-based communication between a service and a client device includes an unresolved user query. This allows the system to determine whether a voice-based communication occurred between the service and the client device at a time subsequent to the text-based communication. The system may then determine whether the voice-based communication includes the unresolved user query and a service response to the same unresolved user query. The system may then provide the unresolved user query and the service response to update a machine learning model for use during a future text-based communication conducted by the service.

Existing systems fail to account for increased network traffic due to limited capabilities of conventional chatbots. For example, existing systems fail to share information between the chatbot system and other systems, such as those for voice-based communication. The described systems and methods establish a novel connection to share information between the two systems by determining whether two different data streams include the same unresolved user query.

If the system determines that the same user or client device initiated a voice-based communication related to an unresolved user query after attempting to address it through a text-based communication with a chatbot, the system provides the unresolved query and the service response from the voice-based communication to the chatbot system as feedback for improving one or more machine learning models for the chatbot. For example, the machine learning model for the chatbot may be refined or retrained using the information shared from the voice-based communication. By updating the machine learning model, the system helps improve the chatbot such that it can fulfill the user query in the future. By doing so, the system provides the practical benefit of improving the performance of the chatbot and decreasing the need for users to initiate additional communications, such as a voice-based communication to address their queries, thereby reducing network traffic.

The system may receive a first data stream for a first type of communication being conducted by the service using a machine learning model to generate service responses to one or more queries from the client device. In particular, the system may receive a first data stream for a first type of communication between a service and a client device associated with a user account. The first type of communication being conducted by the service using a machine learning model to generate service responses to one or more user queries from the client device. For example, the system may receive a message request from a user to a chatbot to answer a question about their account. The system may request the user to provide a user account identifier before initiating the chat. By requesting the user to provide a user account identifier before initiating the chat, the system is able to identify and combine data streams about this user account to determine whether a call took place after the chatbot failed to answer an inquiry.

The system may determine that a second type of communication occurred between the service and the client device or another client device associated with the user account. In particular, in response to determining that the first data stream includes an unresolved user query, the system may determine that a second type of communication occurred between the service and the client device or another client device associated with the user account. For example, the system may search for a call between a user and a customer service representative after determining that a chat took place between a user and a chatbot associated with the same user account. By determining a second type of communication occurred, the system is able to determine the chatbot needs to be optimized for a new inquiry type.

The system may process a second data stream for the second type of communication. In particular, the system may process a second data stream for the second type of communication to determine that the second type of communication includes the unresolved user query and a service response to the unresolved user query. For example, the system may process the call between the user and a customer service representative to determine what question about their account the user had and what action the customer service representative took to solve the question. For example, a user may request to open a new account. The customer service representative may be able to open a new account after receiving the user's identification information. The system may process this call and receive a sentiment associated with this question as well as the service response to request a user's identification information before opening a new account. By processing the second data stream, the system is able to identify what service responses the chatbot lacks.

The system may provide the unresolved user query and the service response to update the machine learning model. In particular, the system may provide the unresolved user query and the service response to update the machine learning model for use during a future communication of the first type conducted by the service. For example, the system may provide the sentiment associated with the unresolved user query and the service response to request a user's identification information before opening a new account to the machine learning model used to train the chatbot. Then the system would update the machine learning model to include what to do for this particular question for future communication with any users. By providing the unresolved user query and the service response to update the machine learning model, the system is able to help improve chatbot performance.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
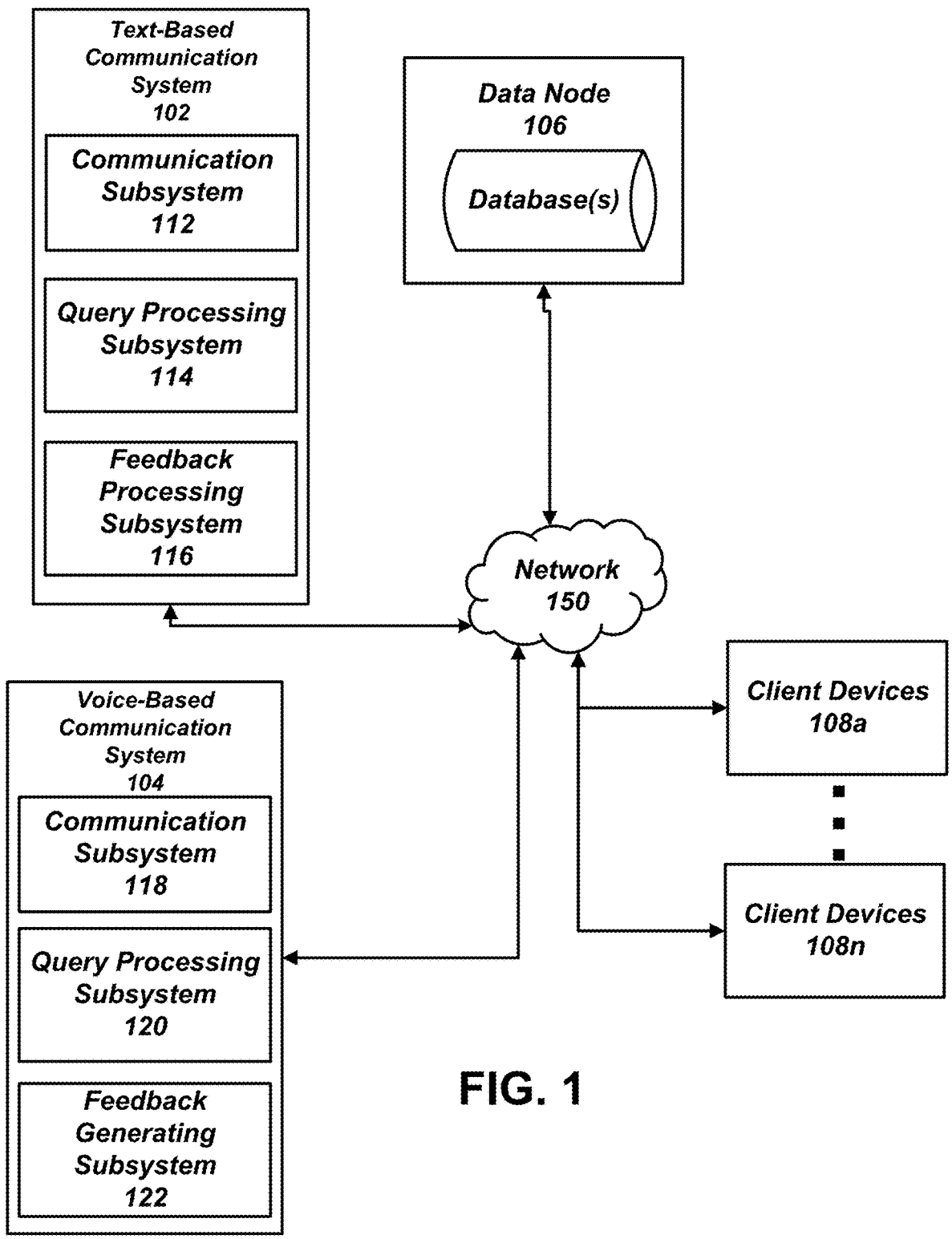
FIG. 1 shows an illustrative diagram for reducing network traffic, in accordance with one or more embodiments.

FIG. 1 shows an illustrative environment for reducing network traffic between a service and client devices, in accordance with one or more embodiments of this disclosure. Environment 100 includes text-based communication system 102, voice-based communication system 104, data node 106, and client devices 108a-108n. Text-based communication system 102 may include software, hardware, or a combination of both and may reside on a physical server or a virtual server running on a physical computer system (e.g., server 202 described with respect to FIG. 2A). In some embodiments, text-based communication system 102 may be configured on a user device (e.g., a laptop computer, a smartphone, a desktop computer, an electronic tablet, or another suitable user device). Voice-based communication system 104 may reside on a physical server or a virtual server running on a physical computer system (e.g., server 202 described with respect to FIG. 2A). In some embodiments, voice-based communication system 104 may be configured on a user device (e.g., a laptop computer, a smartphone, a desktop computer, an electronic tablet, or another suitable user device). Furthermore, text-based communication system 102 and voice-based communication system 104 may reside on a cloud-based system and/or interface with computer models either directly or indirectly, for example, through network 150. Text-based communication system 102 may include communication subsystem 112, query processing subsystem 114, and/or feedback processing subsystem 116. Voice-based communication system 104 may include communication subsystem 118, query processing subsystem 120, and/or feedback generating subsystem 122. Data node 106 may store various data, including one or more machine learning models, training data, user data profiles, input data, output data, performance data, and/or other suitable data. Data node 106 may include software, hardware, or a combination of the two. In some embodiments, text-based communication system 102, voice-based communication system 104, and data node 106 may reside on the same hardware and/or the same virtual server or computing device. Network 150 may be a local area network, a wide area network (e.g., the Internet), or a combination of the two.

Client devices 108a-108n may include software, hardware, or a combination of the two. For example, each client device may include software executed on the device or may include hardware such as a physical device. Client devices may include user devices (e.g., a laptop computer, a smartphone, a desktop computer, an electronic tablet, or another suitable user device).

Figure 2A:
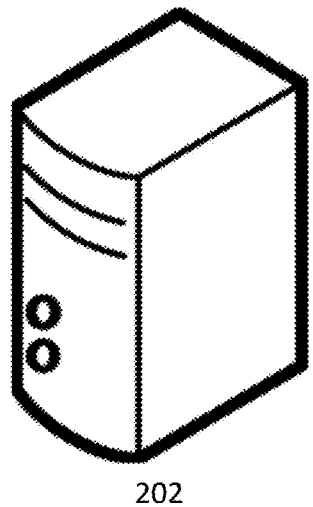
FIGS. 2A-2B show an illustrative diagram for processing two data streams to improve the chatbot model, in accordance with one or more embodiments.
Figure 2A:
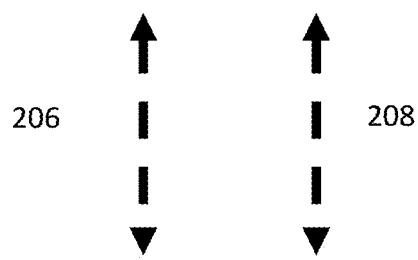
Figure 2A:
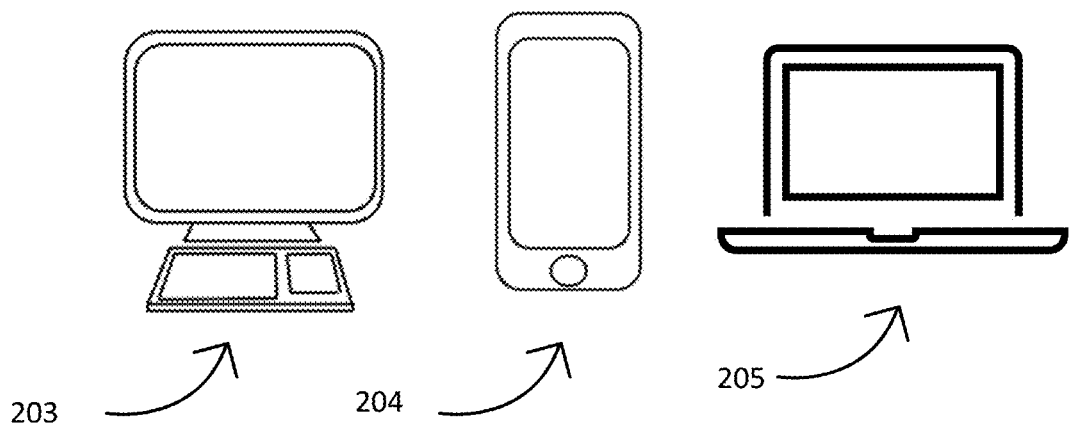

Text-based communication system 102 may receive a data stream from one or more client devices (e.g., client devices 203-client devices 205 from FIG. 2A). Text-based communication system 102 may receive data using communication subsystem 112, which may include software components, hardware components, or a combination of both. For example, communication subsystem 112 may include a network card (e.g., a wireless network card and/or a wired network card) that is associated with software to drive the card and enables communication with network 150. In some embodiments, communication subsystem 112 may also receive data from and/or communicate with data node 106 or another computing device. Communication subsystem 112 may receive data, such as unresolved user queries and service responses. Communication subsystem 112 may communicate with query processing subsystem 114 and feedback processing subsystem 116. Communication subsystem 112 may communicate with communication subsystem 118, query processing subsystem 120, and feedback generating subsystem 122.

Voice-based communication system 104 may receive a data stream from one or more client devices (e.g., client devices 203-client devices 205 from FIG. 2A). Voice-based communication system 104 may receive data using communication subsystem 118, which may include software components, hardware components, or a combination of both. For example, communication subsystem 118 may include a network card (e.g., a wireless network card and/or a wired network card) that is associated with software to drive the card and enables communication with network 150. In some embodiments, communication subsystem 118 may also receive data from and/or communicate with data node 106 or another computing device. Communication subsystem 118 may receive data, such as voice-based communication including unresolved user queries and service responses. Communication subsystem 118 may communicate with query processing subsystem 120 and feedback generating subsystem 122. Communication subsystem 118 may communicate with communication subsystem 112, query processing subsystem 114, and feedback processing subsystem 116.

Text-based communication system 102 may include query processing subsystem 114. Communication subsystem 112 may pass at least a portion of the data or a pointer to the data in memory to query processing subsystem 114. Query processing subsystem 114 may include software components, hardware components, or a combination of both. For example, query processing subsystem 114 may include software components or may include one or more hardware components (e.g., processors) that are able to execute operations processing data streams from client devices 108a-108n. Query processing subsystem 114 may access data, such as unresolved user queries. Query processing subsystem 114 may directly access data or nodes associated with client devices 108a-108n and may transmit data to these client devices. Query processing subsystem 114 may, additionally or alternatively, receive data from and/or send data to communication subsystem 112, communication subsystem 118, and feedback processing subsystem 116.

Voice-based communication system 104 may include query processing subsystem 120. Communication subsystem 118 may pass at least a portion of the data or a pointer to the data in memory to query processing subsystem 120. Query processing subsystem 120 may include software components, hardware components, or a combination of both. For example, query processing subsystem 120 may include software components or may include one or more hardware components (e.g., processors) that are able to execute operations processing data streams from client devices 108a-108n. Query processing subsystem 120 may access data, such as unresolved user queries. Query processing subsystem 120 may directly access data or nodes associated with client devices 108a-108n and may transmit data to these client devices. Query processing subsystem 120 may, additionally or alternatively, receive data from and/or send data to communication subsystem 112, communication subsystem 118, and feedback generating subsystem 122.

Feedback processing subsystem 116 may execute tasks relating to updating the chatbot machine learning model. Feedback processing subsystem 116 may include software components, hardware components, or a combination of both. For example, in some embodiments, feedback processing subsystem 116 may receive a service response to an unresolved user query to update the machine learning model (e.g., machine learning model 214 from FIG. 2B). Feedback processing subsystem 116 may receive input data by client devices 108a-108n. Feedback processing subsystem 116 may transmit output data to client devices 108a-108n. Feedback processing subsystem 116 may allow text-based communication system 102 to improve the chatbot machine learning model, in accordance with one or more embodiments. Feedback processing subsystem 116 may, additionally or alternatively, receive data from and/or send data to communication subsystem 112 or communication subsystem 118, or query processing subsystem 114.

Feedback generating subsystem 122 may execute tasks relating to generated feedback based on information extracted from a voice-based communication. Feedback generating subsystem 122 may include software components, hardware components, or a combination of both. For example, in some embodiments, feedback generating subsystem 122 may transmit a service response to an unresolved user query to update the machine learning model (e.g., machine learning model 214 from FIG. 2B). Feedback generating subsystem 122 may transmit input data by client devices 108a-108n. Feedback generating subsystem 122 may receive output data to client devices 108a-108n. Feedback generating subsystem 122 may allow voice-based communication system 104 to share feedback to improve the chatbot machine learning model, in accordance with one or more embodiments. Feedback generating subsystem 122 may, additionally or alternatively, receive data from and/or send data to communication subsystem 118 or communication subsystem 112, or query processing subsystem 120.

Text-based communication system 102 may receive a first data stream for a first type of communication being conducted by the service using a machine learning model to generate service responses to one or more queries from the client device. In particular, the text-based communication system 102 may receive a first data stream for a first type of communication between a service and a client device associated with a user account. The first type of communication being conducted by the service using a machine learning model to generate service responses to one or more user queries from the client device. For example, the system may receive a message request from a user to a chatbot to answer a question about their account. The system may request the user to provide a user account identifier before initiating the chat. By requesting the user to provide a user account identifier before initiating the chat, the system is able to identify and combine data streams about this user account to determine whether a call took place after the chatbot failed to answer an inquiry.

Figure 2B:
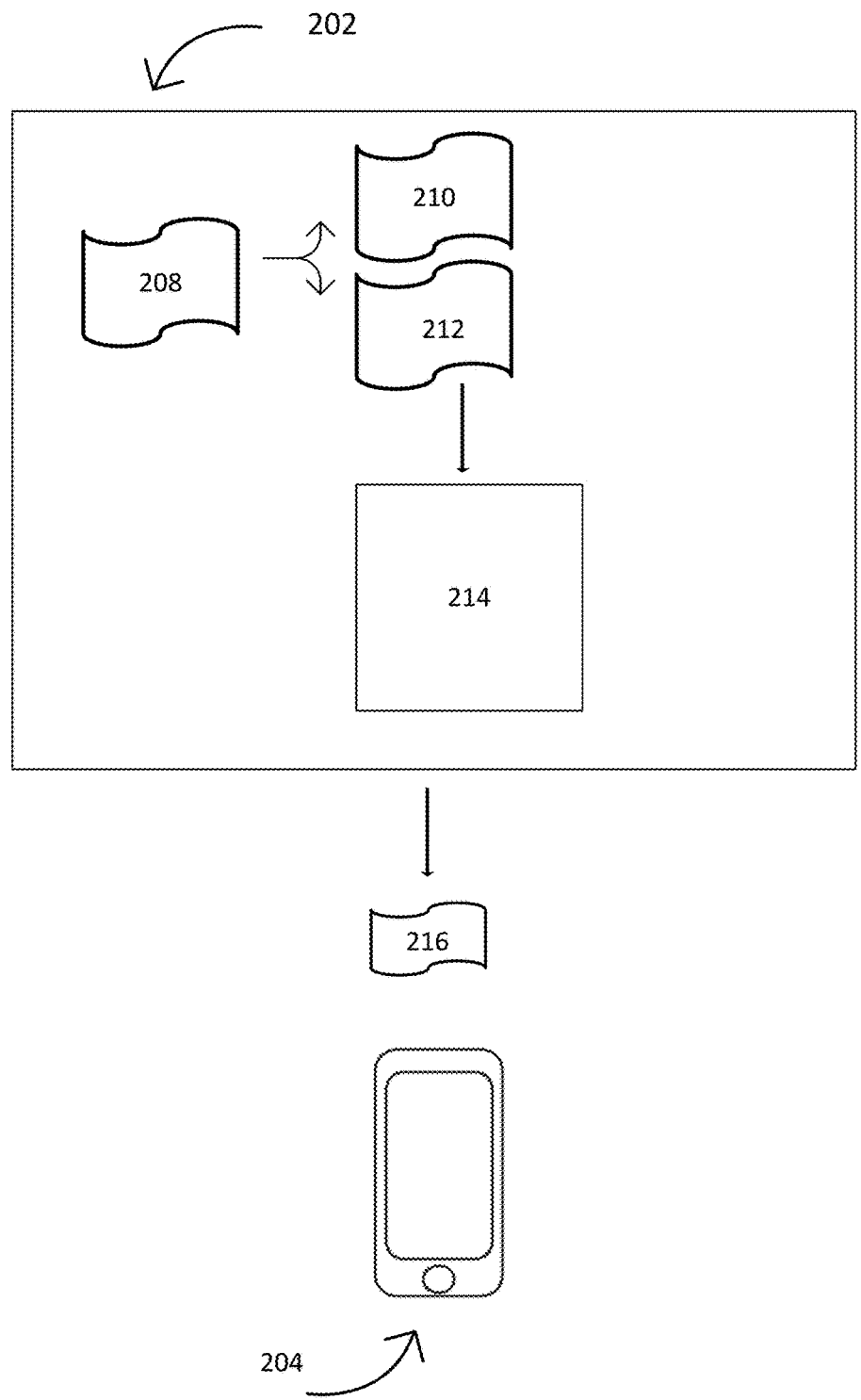

FIGS. 2A-FIG. 2B show illustrative diagrams for processing two data streams to improve the chatbot model, in accordance with one or more embodiments. FIG. 2A shows environment 200. Environment 200 includes server 202, client device 203, client device 204, client device 205, data stream 206, and data stream 208.

Server 202 may receive a first data stream (e.g., data stream 206) for a first type of communication being conducted by the service using a machine learning model to generate service responses to one or more queries from the client device (e.g., client device 203, or client device 204, or client device 205). In particular, server 202 may receive a first data stream (e.g., data stream 206) for a first type of communication between a service and a client device (e.g., a text-based communication with a chatbot) associated with a user account. The first type of communication being conducted by the service using a machine learning model to generate service responses to one or more user queries from the client device (e.g., client device 203, client device 204, or client device 205). For example, the text-based communication system 102 may receive a message request from a user to a chatbot to answer a question about their account. The system may request the user to provide a user account identifier before initiating the chat. By requesting the user to provide a user account identifier before initiating the chat, the text-based communication system 102 is able to identify and combine data streams (data streams 206 and 208) about this user account to determine whether a voice-based communication took place after a failed text-based communication (e.g., a chatbot failed to answer a user inquiry). Thus, server 202 may receive a first data stream (e.g., data stream 206) for a text-based communication between a service and a client device.

Server 202 may determine that a second type of communication occurred between the service and the client device (e.g., client device 203, client device 204, or client device 205) or another client device (e.g., client device 203, client device 204, or client device 205) associated with the user account. In particular, in response to determining that the first data stream (e.g., data stream 206) includes an unresolved user query, voice-based communication system 104 may determine that a second type of communication (e.g., a voice-based communication) occurred between the service and the client device (e.g., client device 203, client device 204, or client device 205) or another client device (e.g., client device 203, client device 204, or client device 205) associated with the user account. For example, voice-based communication system 104 may search for a voice-based communication between a user and a customer service representative after text-based communication system 102 determines that a text-based communication took place between a user and a chatbot associated with the same user account. By determining whether a voice-based communication occurred, text-based communication system 102 is able to determine whether the chatbot needs to be optimized for a new inquiry type. Thus, text-based communication system 102 and voice-based communication system 104 may determine a second type of communication occurred for the same user account.

In some embodiments, server 202 may determine that a threshold period of time elapsed. In particular, wherein determining that the first data stream (e.g., data stream 206) includes an unresolved user query, server 202 may determine that a threshold period of time elapsed since the unresolved user query was received during the text-based communication. For example, server 202 may determine whether an excessive amount of time elapsed after server 202 received the first data stream (e.g., data stream 206) before receiving a second data stream associated with the user account. Therefore, text-based communication system 102 and voice-based communication system 104 may determine whether the first data stream (e.g., data stream 206) and the second data stream (e.g., data stream 208) include the same unresolved user query. Thus, text-based communication system 102 and voice-based communication system 104 may determine whether the systems are processing the same unresolved user query for the same user account.

In some embodiments, server 202 may determine the last set of words in a text-based communication. In particular, wherein determining that the first data stream includes an unresolved user query, server 202 may determine that a last set of words in the text-based communication does not include a word indicating an end of a conversation. For example, text-based communication system 102 may analyze the last set of words a user sent to the chatbot and recognize that the user abruptly ended the text-based communication. Thus, server 202 may determine whether the user decided to stop the text-based communication in favor of a voice-based communication with a human agent.

In some embodiments, server 202 may determine the two types of communication are associated with the same user account. In particular, wherein determining that a second type of communication occurred between the service and the client device (e.g., client device 203, client device 204, or client device 205), server 202 may determine that the first type of communication and the second type of communication are associated with the same user account. For example, both text-based communication system 102 and voice-based communication system 104 may request a user account identifier before initiating any communication with an agent. Thus, server 202 may determine whether the first data stream (e.g., data stream 206) and the second data stream (e.g., data stream 208) include the same unresolved user query.

In some embodiments, the first type of communication generates less network traffic than the second type of communication. In some embodiments, the first type of communication comprises text-based communication and the second type of communication comprises voice-based communication. In some embodiments, network traffic is reduced for subsequent instances of the unresolved user query due to a corresponding service response being generated during the first type of communication, thereby preventing occurrence of the second type of communication including the unresolved user query. For example, the second type of communication (e.g., voice-based communication) creates audio traffic for phone calls. However, by directing users to use the first type of communication (e.g., text-based communication), the system may generate less network traffic.

FIG. 2B shows environment 230. Environment 230 includes server 202, client device 204, data stream 208, unresolved user query 210, service response 212, and future service response 216.

Server 202 may process a second data stream (e.g., data stream 208) for the second type of communication (e.g., voice-based communication). In particular, server 202 may process a second data stream (e.g., data stream 208) for the second type of communication (e.g., voice-based communication) to determine that the second type of communication includes the unresolved user query (e.g., unresolved user query 210) and a service response (e.g., service response 212) to the unresolved user query (e.g., unresolved user query 210). For example, query processing subsystems 114 and 120 may process a call between the user and an agent to determine what question about their account the user had and what action the agent took to solve the question. For example, a user may request to open a new account (e.g., unresolved user query 210). The agent may be able to open a new account after receiving the user's identification information. The system may process this call and receive a sentiment associated with this question as well as the service response to request a user's identification information before opening a new account (e.g., service response 212). By processing the second data stream (e.g., data stream 208), server 202 is able to identify what service responses (e.g., service response 212) the chatbot lacks.

In some embodiments, server 202 may identify a first flag for the unresolved user query and a second flag for the service response. In particular, while processing a second data stream (e.g., data stream 208) for the second type of communication (e.g., voice-based communication) to determine that the second type of communication includes the unresolved user query and a service response to the unresolved user query, server 202 may identify a first flag for the unresolved user query and a second flag for the service response embedded within or received with the second type of communication. For example, server 202 may receive a data stream from voice-based communication system 104. Server 202 may process the data stream (e.g., data stream 208) for a first flag to identify an unresolved user query (e.g., unresolved user query 210) and a second flag to identify a service response (e.g., service response 212). Thus, voice-based communication system 104 may identify the unresolved user query and service response.

Voice-based communication system 104 may provide the unresolved user query (e.g., unresolved user query 210) and the service response (e.g., service response 212) to update the machine learning model (e.g., machine learning model 214). In particular, voice-based communication system 104 may provide the unresolved user query (e.g., unresolved user query 210) and the service response (e.g., service response 212) to update the machine learning model (e.g., machine learning model 214) for use during a future communication of the first type conducted by the service. For example, voice-based communication system 104 may provide the sentiment associated with the unresolved user query and the service response to request a user's identification information before opening a new account to the machine learning model used to train the chatbot. Then voice-based communication system 104 would update the machine learning model to include what to do for this particular question (e.g., unresolved user query 210) for future communication with any users. By voice-based communication system 104 providing the unresolved user query (e.g., unresolved user query 210) and the service response (e.g., service response 212) to update the machine learning model (e.g., machine learning model 214), server 202 is able to ensure chatbot performance improves.

In some embodiments, server 202 may generate a service response in response to future communication (e.g., future service response 216). In particular, server 202 may use the updated machine learning model (e.g., machine learning model 214) to generate the service response (e.g., service response 216) in response to receiving the unresolved user query during future communication. For example, text-based communication system 102 may generate the service response to request a user's identification information before opening a new account (e.g., service response 212 and/or future service response 216) in response to receiving the same unresolved user query (e.g., unresolved user query 210). Thus, server 202 is able to ensure the chatbot may solve more user queries instead of users using voice-based communication with an agent.

Figure 3:
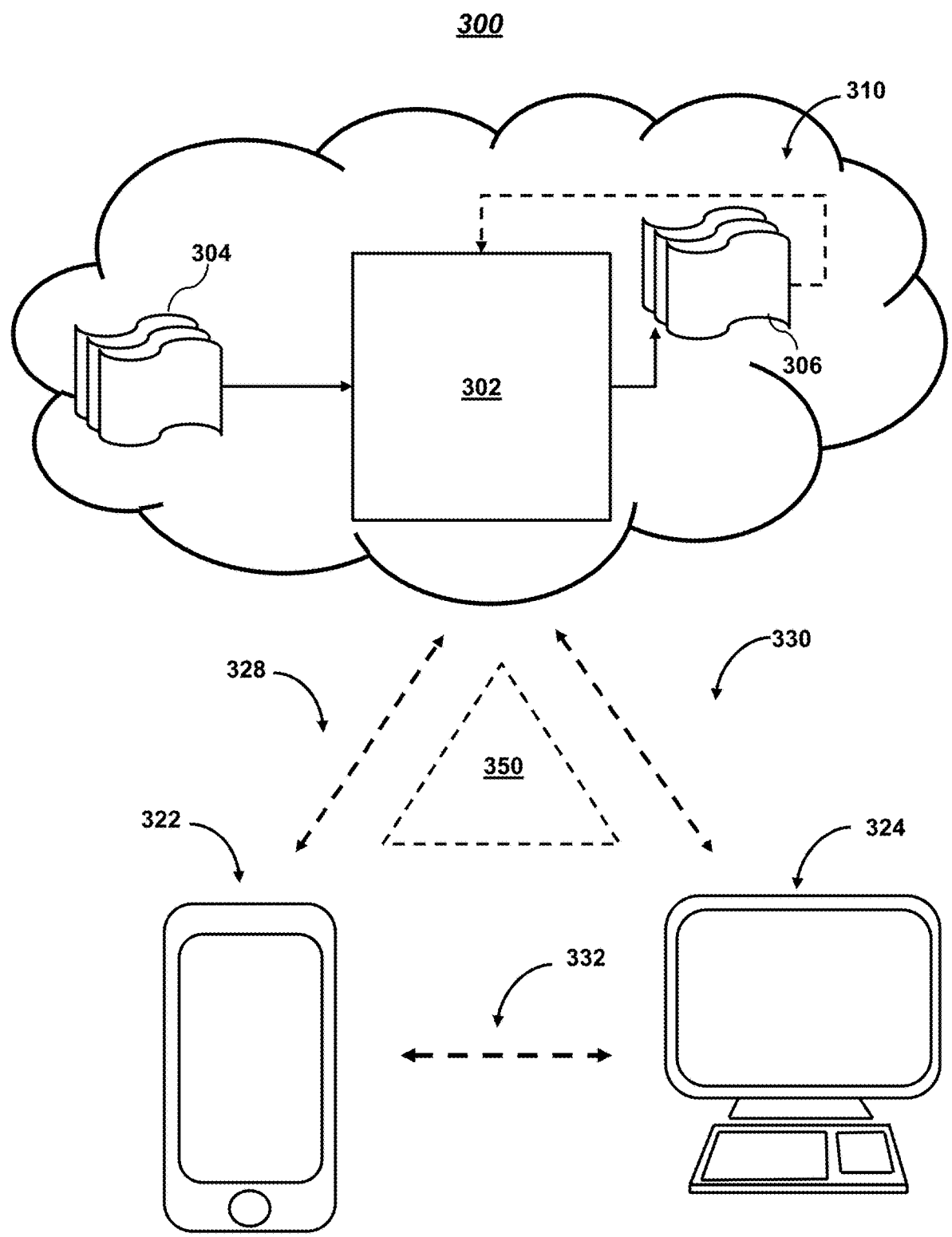
FIG. 3 shows illustrative components for a system used to improve the chatbot model, in accordance with one or more embodiments.

FIG. 3 shows illustrative components for a system used to improve the chatbot machine learning model, in accordance with one or more embodiments. For example, FIG. 3 may show illustrative components for reducing network traffic. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a handheld computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system and may feature one or more component devices. It should also be noted that system 300 is not limited to three devices. Users may, for instance, utilize one or more devices to interact with one another, one or more servers, or other components of system 300. It should be noted that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as touchscreen smartphones, these displays also act as user input interfaces. It should be noted that in some embodiments, the devices may have neither user input interfaces nor displays and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include text-based communication system 102, communication subsystem 112, query processing subsystem 114, feedback processing subsystem 116, voice-based communication system 104, communication subsystem 118, query processing subsystem 120, feedback generating subsystem 122, data node 106, or client devices 108a-108n, and may be connected to network 150. Cloud components 310 may access data streams (e.g., data streams 206 and 208) and the unresolved user queries included within the data streams.

Cloud components 310 may include model 302, which may be a machine learning model, artificial intelligence model, etc. (which may be referred to collectively as "models" herein). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., predicting service responses).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, backpropagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., classifying user queries).

In some embodiments, the model (e.g., model 302) may automatically perform actions based on outputs 306. In some embodiments, the model (e.g., model 302) may not perform any actions. The output of the model (e.g., model 302) may be used to train the chatbot for improved performance for future user queries.

System 300 also includes API layer 350. API layer 350 may allow the system to generate summaries across different devices. In some embodiments, API layer 350 may be implemented on a user device (e.g., mobile device 322 or user terminal 324). Alternatively or additionally, API layer 350 may reside on one or more of cloud components 310. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web-services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use Advanced Message Queuing Protocol (AMQP) (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying web application (WAF) and denial-of-service (DDoS) protection, and API layer 350 may use RESTful APIs as standard for external integration.

Figure 4:
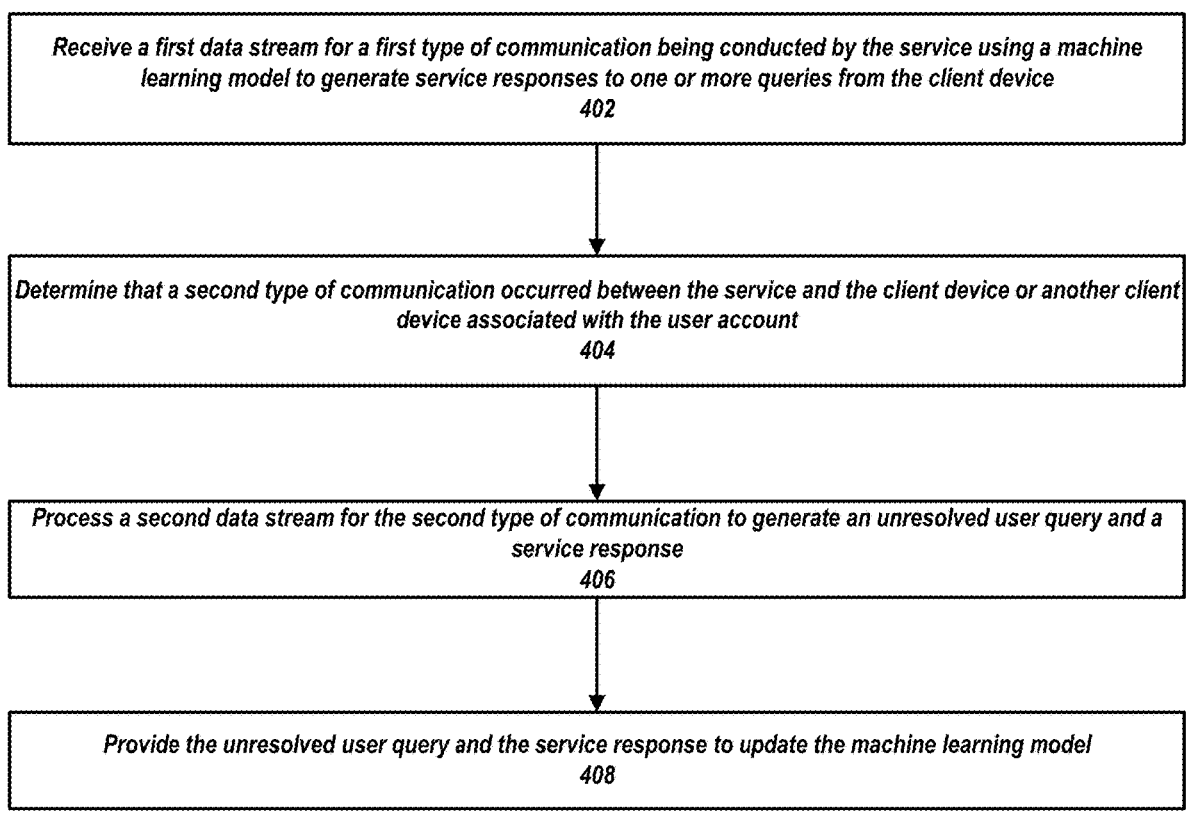
FIG. 4 shows a flowchart of the steps involved in reducing network traffic by improving the chatbot model, in accordance with one or more embodiments.

FIG. 4 shows a flowchart of the steps involved in reducing network traffic by improving the chatbot model, in accordance with one or more embodiments. For example, the system may use process 400 (e.g., as implemented on one or more system components described above) in order to reduce network traffic.

At operation 402, process 400 (e.g., using one or more components described above) may receive a first data stream for a first type of communication being conducted by the service using a machine learning model to generate service responses to one or more queries from the client device. For example, the system may receive a first data stream for a first type of communication between a service and a client device associated with a user account. The first type of communication being conducted by the service using a machine learning model (e.g., machine learning model 214 or model 302) to generate service responses (e.g., service response 212) to one or more user queries from the client device (e.g., client device 203, client device 204, or client device 205). For example, the communication subsystem 112 may receive a message request from a user to a chatbot to answer a question about their account from a client device (e.g., client device 203, client device 204, or client device 205) using communication paths 328, 330, and 332. The system may request the user to provide a user account identifier before initiating the chat. By doing so, the system may identify and combine data streams about the same user account to determine whether a voice-based communication occurred after a text-based communication failed to answer an inquiry.

At operation 404, process 400 (e.g., using one or more components described above) may determine that a second type of communication occurred between the service and the client device (e.g., client device 203, client device 204, client device 205, or mobile device 322) or another client device (e.g., client device 203, client device 204, client device 205, or mobile device 322) associated with the user account. For example, in response to determining that the first data stream (e.g., data stream 206) includes an unresolved user query, the system may determine that a second type of communication (e.g., a voice-based communication) occurred between the service and the client device (e.g., client device 203, client device 204, client device 205, or mobile device 322) or another client device (e.g., client device 203, client device 204, client device 205, or mobile device 322) associated with the user account. For example, voice-based communication system 104 may search for a voice-based communication between a user and a customer service representative after text-based communication system 102 determines that a text-based communication took place between a user and a chatbot associated with the same user account. By doing so, text-based communication system 102 is able to determine whether the chatbot needs to be optimized for a new inquiry type. Thus, text-based communication system 102 and voice-based communication system 104 may determine a second type of communication occurred for the same user account.

In some embodiments, the system may determine that a threshold period of time elapsed. For example, wherein determining that the first data stream (e.g., data stream 206) includes an unresolved user query, the system may determine that a threshold period of time elapsed since the unresolved user query was received during the text-based communication. For example, server 202 may determine whether an excessive amount of time elapsed after server 202 received the first data stream (e.g., data stream 206) before receiving a second data stream associated with the user account. Therefore, text-based communication system 102 and voice-based communication system 104 may determine whether the first data stream (e.g., data stream 206) and the second data stream (e.g., data stream 208) include the same unresolved user query. By doing so, the system may determine whether the systems are processing the same unresolved user query for the same user account.

In some embodiments, the system may determine the last set of words in a text-based communication. For example, wherein determining that the first data stream includes an unresolved user query, the system may determine that a last set of words in the text-based communication does not include a word indicating an end of a conversation. For example, text-based communication system 102 may analyze the last set of words a user sent to the chatbot and recognize the user abruptly ended the text-based communication. By doing so, the system may determine whether the user decided to stop the text-based communication in favor of a voice-based communication with a human agent.

In some embodiments, the system may determine the two types of communication are associated with the same user account. For example, wherein determining that a second type of communication occurred between the service and the client device (e.g., client device 203, client device 204, or client device 205), the system may determine that the first type of communication and the second type of communication are associated with the same user account. For example, both text-based communication system 102 and voice-based communication system 104 may request a user account identifier before initiating any communication with an agent. By doing so, the system may determine whether the first data stream (e.g., data stream 206) and the second data stream (e.g., data stream 208) include the same unresolved user query.

At operation 406, process 400 (e.g., using one or more components described above) may process a second data stream (e.g., data stream 208) for the second type of communication (e.g., voice-based communication) to generate an unresolved user query (e.g., unresolved user query 210) and a service response (e.g., service response 212). For example, the system may process a second data stream (e.g., data stream 208) for the second type of communication (e.g., voice-based communication) to determine that the second type of communication includes the unresolved user query (e.g., unresolved user query 210) and a service response (e.g., service response 212) to the unresolved user query (e.g., unresolved user query 210). For example, query processing subsystems 114 and 120 may process a call between the user and an agent to determine what question about their account the user had and what action the agent took to solve the question. For example, a user may request to open a new account (e.g., unresolved user query 210). The agent may be able to open a new account after receiving the user's identification information. The system may process this call and receive a sentiment associated with this question as well as the service response to request a user's identification information before opening a new account (e.g., service response 212). By doing so, the system may identify what service responses (e.g., service response 212) the chatbot lacks.

At operation 408, process 400 (e.g., using one or more components described above) may provide the unresolved user query (e.g., unresolved user query 210) and the service response (e.g., service response 212) to update the machine learning model (e.g., machine learning model 214). For example, the system may provide the unresolved user query (e.g., unresolved user query 210) and the service response (e.g., service response 212) to update the machine learning model (e.g., machine learning model 214 or model 302) for use during a future communication of the first type conducted by the service. For example, the system may provide the sentiment associated with the unresolved user query and the service response to request a user's identification information before opening a new account to the machine learning model used to train the chatbot. Then the system may update the machine learning model (e.g., machine learning model 214 or model 302) to include what to do for this particular question (e.g., unresolved user query 210 or input 304) for future communication with any users. By doing so, the system may ensure chatbot performance improves.

In some embodiments, the system may generate a service response in response to future communication (e.g., future service response 216). For example, the system may use the updated machine learning model (e.g., machine learning model 214) to generate the service response (e.g., future service response 216 or output 306) in response to receiving the unresolved user query during future communication. For example, text-based communication system 102 may generate the service response to request a user's identification information before opening a new account (e.g., service response 212 and/or service response 216 and/or output 306) in response to receiving the same unresolved user query (e.g., unresolved user query 210 and/or input 304). Communication subsystem 112 may transmit the service response to a client device (e.g., client device 204 or mobile device 322). By doing so, the system may ensure the chatbot may solve more user queries instead of users using voice-based communication with an agent.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for reducing network traffic between a service and client devices, the method comprising: receiving a first data stream for a text-based communication between a service and a client device associated with a user account, the text-based communication being conducted by the service using a machine learning model to generate service responses to one or more user queries from the client device; in response to determining that the first data stream includes an unresolved user query, determining that a voice-based communication occurred between the service and the client device at a time subsequent to the text-based communication; processing a second data stream for the voice-based communication to determine that the voice-based communication includes the unresolved user query and a service response to the unresolved user query; and providing the unresolved user query and the service response to update the machine learning model for use during a future text-based communication conducted by the service, wherein: the service uses the updated machine learning model to generate the service response in response to receiving the unresolved user query during the future text-based communication.

2. A method for reducing network traffic between a service and client devices, the method comprising: receiving a first data stream for a first type of communication between a service and a client device, the first type of communication being conducted by the service using a machine learning model to generate service responses to one or more user queries from the client device; in response to determining that the first data stream includes an unresolved user query, determining that a second type of communication occurred between the service and the client device at a time subsequent to the first type of communication; processing a second data stream for the second type of communication to determine that the second type of communication includes the unresolved user query and a service response to the unresolved user query; and providing the unresolved user query and the service response to update the machine learning model for use during a future communication of the first type conducted by the service.

3. A method, the method comprising: receiving a first data stream for a first type of communication between a service and a client device associated with a user account, the first type of communication being conducted by the service using a machine learning model to generate service responses to one or more user queries from the client device; in response to determining that the first data stream includes an unresolved user query, determining that a second type of communication occurred between the service and the client device or another client device associated with the user account; processing a second data stream for the second type of communication to determine that the second type of communication includes the unresolved user query and a service response to the unresolved user query; and providing the unresolved user query and the service response to update the machine learning model for use during a future communication of the first type conducted by the service.

4. The method of any one of the preceding embodiments, wherein determining that the first data stream includes an unresolved user query comprises determining that a threshold period of time elapsed since the unresolved user query was received during the text-based communication.

5. The method of any one of the preceding embodiments, wherein determining that the first data stream includes an unresolved user query comprises determining that a last set of words in the text-based communication does not include a word indicating an end of a conversation.

6. The method of any one of the preceding embodiments, wherein the service uses the updated machine learning model to generate the service response in response to receiving the unresolved user query during the future communication.

7. The method of any one of the preceding embodiments, wherein determining that a second type of communication occurred between the service and the client device comprises determining that the first type of communication and the second type of communication are associated with a same user account.

8. The method of any one of the preceding embodiments, wherein the first type of communication generates less network traffic than the second type of communication.

9. The method of any one of the preceding embodiments, wherein the first type of communication comprises text-based communication and the second type of communication comprises voice-based communication.

10. The method of any one of the preceding embodiments, wherein network traffic is reduced for subsequent instances of the unresolved user query due to a corresponding service response being generated during the first type of communication, thereby preventing occurrence of the second type of communication including the unresolved user query.

11. The method of any one of the preceding embodiments, wherein processing a second data stream for the second type of communication to determine that the second type of communication includes the unresolved user query and a service response to the unresolved user query comprises identifying a first flag for the unresolved user query and a second flag for the service response embedded within or received with the second type of communication.

12. A tangible, non-transitory, machine-readable medium storing instructions that, when executed by a data processing apparatus, cause the data processing apparatus to perform operations comprising those of any of embodiments 1-11.

13. A system comprising one or more processors; and memory storing instructions that, when executed by the processors, cause the processors to effectuate operations comprising those of any of embodiments 1-11.

14. A system comprising means for performing any of embodiments 1-11.

What is claimed is:

1. A system for reducing network traffic associated with a service, the system comprising:
   memory; and
   one or more processors, coupled to the memory, configured to cause the system to:
   identify a first type of communication that is conducted by the service using a machine learning model and that is between a chatbot of the service and a client device associated with an account;
   identify a second type of communication that is between the service and the client device or another client device associated with the account and that generates more network traffic than the first type of communication;
   determine that the second type of communication includes a same unresolved query that is included in the first type of communication; and
   update, for a future communication with the chatbot and based on determining that the second type of communication includes the same unresolved query that is included in the first type of communication, the machine learning model with a service response that addresses the same unresolved query and is included in the second type of communication.

2. The system of claim 1,
   wherein the first type of communication is a text-based communication, and
   wherein the second type of communication is a voice-based communication.

3. The system of claim 1, wherein the second type of communication is between the service and the client device.

4. The system of claim 1, wherein the second type of communication is between the service and the other client device.

5. The system of claim 1, wherein the one or more processors are configured to cause the system to:
   determine that a threshold period of time elapsed after the system received a data stream for the first type of communication; and
   determine that the first type of communication includes the same unresolved query based on determining that the threshold period of time elapsed.

6. The system of claim 5, wherein, to determine that the threshold period of time elapsed, the one or more processors are configured to cause the system to:
   determine that the threshold period of time elapsed after the system received the data stream for the first type of communication and before receiving another data stream for the second type of communication.

7. The system of claim 1, wherein the one or more processors are configured to cause the system to:
   determine a last portion of the first type of communication;
   determine that the last portion of the first type of communication does not include an indication of an end of a conversation; and
   determine that the first type of communication includes the same unresolved query based on determining that the last portion of the first type of communication does not include the indication of the end of a conversation.

8. The system of claim 1, wherein the one or more processors are configured to cause the system to:
   use the machine learning model to generate the service response based on receiving the same unresolved query during the future communication with the chatbot.

9. A method for reducing network traffic associated with a service, the method comprising:
   identifying a first type of communication that is conducted by the service using a machine learning model and that is between the service and a client device associated with an account;
   identifying a second type of communication that is between the service and the client device or another client device associated with the account;
   determining that the second type of communication includes a same unresolved query that is included in the first type of communication; and
   updating, based on determining that the second type of communication includes the same unresolved query that is included in the first type of communication, the machine learning model for a future communication.

10. The method of claim 9,
    wherein the first type of communication is a text-based communication, and
    wherein the second type of communication is a voice-based communication.

11. The method of claim 9, wherein the second type of communication is between the service and the client device.

12. The method of claim 9, wherein the second type of communication is between the service and the other client device.

13. The method of claim 9, further comprising:
    determining that a threshold period of time elapsed after a reception of a data stream for the first type of communication; and
    determining that the first type of communication includes the same unresolved query based on determining that the threshold period of time elapsed.

14. The method of claim 13, wherein determining that the threshold period of time elapsed comprises:
    determining that the threshold period of time elapsed after the reception of the data stream for the first type of communication and before a reception of another data stream for the second type of communication.

15. The method of claim 9, further comprising:
    determining that a last portion of the first type of communication;
    determining that the last portion of the first type of communication does not include an indication of an end of a conversation; and
    determining that the first type of communication includes the same unresolved query based on determining that the last portion of the first type of communication does not include the indication of the end of a conversation.

16. The method of claim 9, further comprising:
    using, after updating the machine learning model, the machine learning model to generate a service response based on receiving the same unresolved query during the future communication with a chatbot.

17. One or more non-transitory, computer-readable media comprising instructions that, when executed by one or more processors, cause operations comprising:
    identifying a first type of communication that is conducted by a service using a machine learning model and that is between the service and a client device associated with an account;
    identifying a second type of communication that is between the service and the client device or another client device associated with the account;
    determining that the second type of communication includes a same unresolved query that is included in the first type of communication; and
    updating, based on determining that the second type of communication includes the same unresolved query that is included in the first type of communication, the machine learning model.

18. The one or more non-transitory, computer-readable media of claim of claim 17,
    wherein the first type of communication is a text-based communication, and
    wherein the second type of communication is a voice-based communication.

19. The one or more non-transitory, computer-readable media of claim of claim 17,
    wherein the second type of communication is between the service and the client device.

20. The one or more non-transitory, computer-readable media of claim of claim 17, wherein the operations further comprise:
    determining that a threshold period of time elapsed after a reception of a data stream for the first type of communication; and
    determining that the first type of communication includes the same unresolved query based on determining that the threshold period of time elapsed.

\* \* \* \* \*